June 24, 1941.　　　G. B. L. ELLIS　　　2,247,053
ROTATIVE WINGED AIRCRAFT
Filed Jan. 9, 1939　　　2 Sheets-Sheet 1

INVENTOR.
George Bertrand Leslie Ellis
BY
Symmestvedt + Lechner
ATTORNEYS.

June 24, 1941.  G. B. L. ELLIS  2,247,053
ROTATIVE WINGED AIRCRAFT
Filed Jan. 9, 1939  2 Sheets-Sheet 2
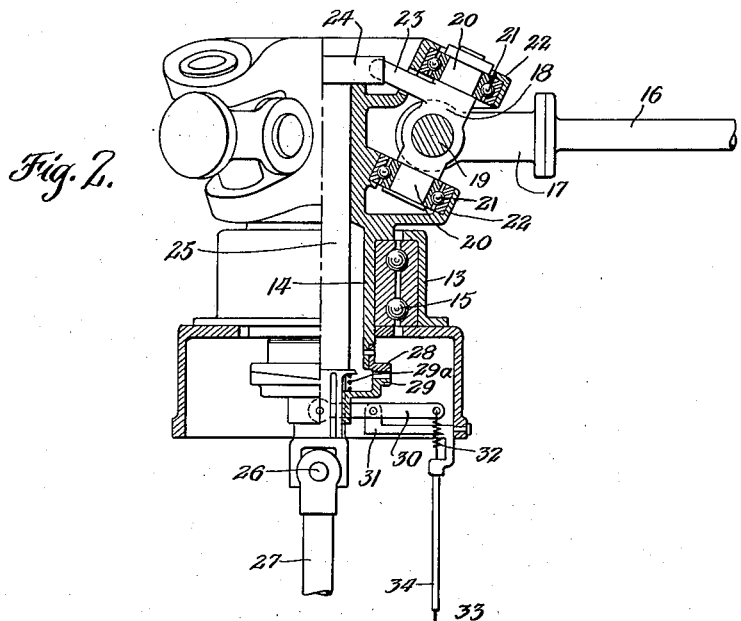
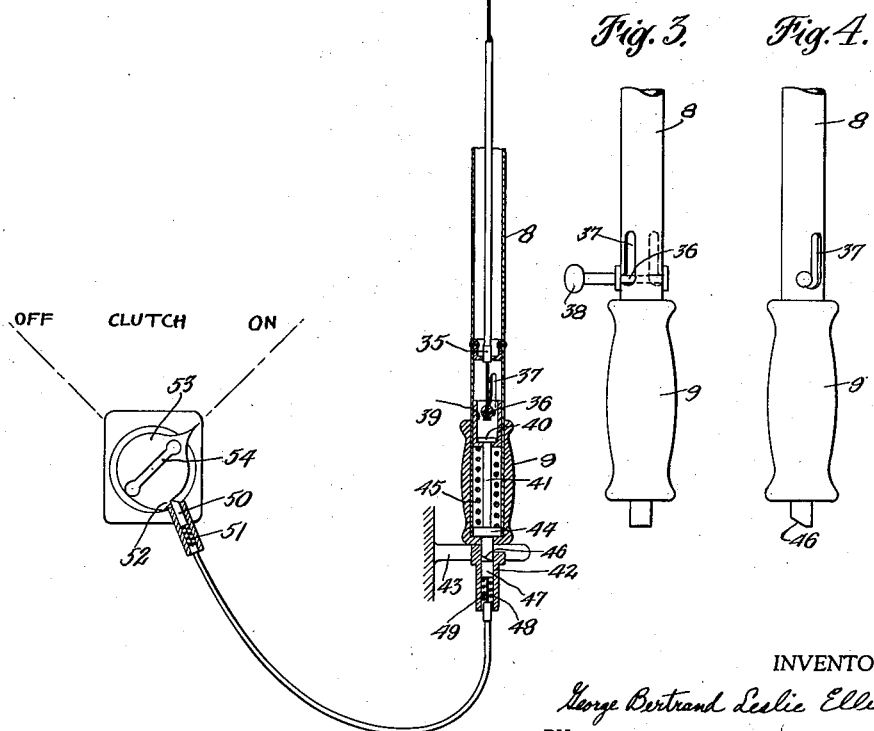
INVENTOR.
George Bertrand Leslie Ellis
BY
Synnestvedt + Lechner
ATTORNEYS.

Patented June 24, 1941

2,247,053

UNITED STATES PATENT OFFICE 2,247,053

ROTATIVE WINGED AIRCRAFT

George Bertrand Leslie Ellis, Thames Ditton, Surrey, England, assignor to Autogiro Company of America, Willow Grove, Pa., a corporation of Delaware Application January 9, 1939, Serial No. 249,863
In Great Britain January 13, 1938

7 Claims. (Cl. 244—18)

This invention relates to rotative winged aircraft, and particularly to that type of craft in which a sustaining rotor is employed incorporating a hub and one or more blades articulated to the hub with freedom for movement in the pitch change sense, and preferably also in a direction generally transverse the mean rotative path. The invention, moreover, is especially useful in aircraft of the foregoing type in which the rotor blades are capable of autorotative actuation in flight, but in which means are provided for driving the rotor in preparation for take-off, with the blades at low or substantially zero pitch, the drive desirably being carried to an R. P. M. substantially above the normal autorotative R. P. M., after which, and at the moment of take-off, the drive is disconnected and the blade pitch substantially increased so as to develop a high thrust and thereby effect "direct" or substantially vertical take-off.

In one known form of blade mounting providing for blade pitch change for the above purpose, the blade is connected to the hub by means of an obliquely angled "drag" hinge, the axis of which is positioned at an upwardly and outwardly inclined angle (related to the longitudinal axis of the blade) so that lag and lead displacements of the blade are respectively accompanied by blade pitch reduction and blade pitch increase. A mechanism of this general type is shown in the copending application of Juan de la Cierva, Serial No. 738,349, filed August 3rd, 1934.

A further development of that general type of blade mounting appears in copending application of James Allan Jamieson Bennett, Serial No. 205,352, filed April 30th, 1938, and in accordance therewith a "floating" driving member for the rotor is associated with the rotor hub but capable of limited movement with respect thereto. This floating driving member cooperates with blade mounting parts in such manner that, in addition to the normal tendency for the blade to lag upon the application of torque to the hub, a force is transmitted to the blade such as positively to assure blade movement in the lagging direction about the axis of the drag hinge and, therefore, blade pitch reduction.

In accordance with the present invention, means are incorporated in rotor constructions of the types above referred to providing against premature or undesired take-off. Since in the general types of constructions described, the action of centrifugal force upon the cessation of driving torque acts to move the blade from its lagging toward a more leading position and thus from a low pitch position to a higher pitch position, should the engine falter during acceleration of the rotor in preparation for take-off, the resultant increase of blade pitch might cause the machine to leave the ground before the pilot is actually ready to make the take-off.

The present invention, therefore, provides means for positively locking the blades in low pitch position during driving, the locking means being arranged so that release can only be effected by intentional manipulation of a control on the part of the pilot.

The invention, moreover, is especially adapted for use in connection with the general type of rotor blade mounting and drive described in the aforementioned copending Bennett application, in which a floating driving member is associated with the rotor hub. Thus, in accordance with the present invention, releasable means are provided for positively locking the floating driving member and the hub in such relative positions that the blade has the low pitch angle desired when driving the rotor in preparation for direct take-off as above described.

Still further, the present invention contemplates the employment of a mechanism interlocking operation of the disconnectible clutch for the rotor drive and the means for locking the floating member and the hub, the sense of interlock being such that the rotor drive clutch cannot be disconnected until the locking device for the hub and floating member is manually released by the pilot.

Another feature of the invention is involved in the interlock of the devices just referred to with a control member, such as a control stick, provided for the purpose of shifting the lift line of the rotor so as to maneuver the craft in flight and control the craft during take-off. In accordance with this feature of the invention, the control stick is equipped with latch means for retaining the stick in a predetermined position during driving of the rotor while the craft is on the ground. The present invention incorporates a further interlocking feature by means of which the control stick latch is released simultaneously with release of the means for locking the hub to the floating driving member.

It will be understood that the control, interlock and "safeguard" features of the present invention may be used in association with sustaining rotors incorporating other types of blade mounting and drive mechanism since, in its broader aspects, the invention contemplates the provision of means for maintaining the desired low pitch position of the blades during driving prior to take-off, even when the engine momentarily falters.

The foregoing objects and advantages, together with others, will appear more fully from the following description referring to the accompanying drawings, in which—

Figure 2 is a side view, partly in elevation and partly in vertical section, of the rotor hub and also of a control column, with the mechanism of the present invention applied thereto; and Figures 3 and 4 are elevational views of a portion of the control stick, showing certain details described hereinafter.

Figure 1:
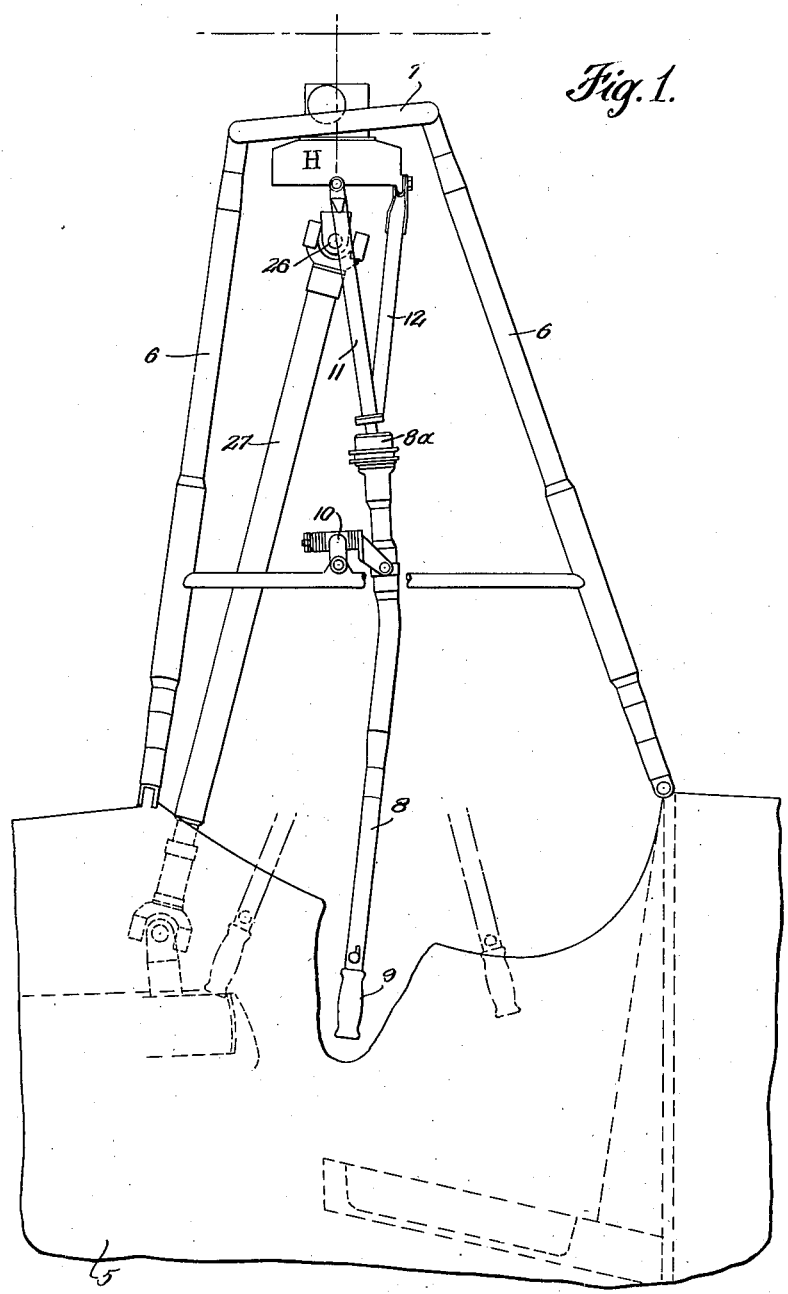
Figure 1 is a side elevational view of a portion of the fuselage of an aircraft of the type here under consideration, the rotor mount, and parts of the control and driving connections therefor.

In Figure 1, a portion of the fuselage or body of the craft appears at 5, it being understood that the aircraft may be provided with forward propulsion means such as an engine and air screw mounted in the nose of the body. Suitable tail surfaces may also be employed.

The rotor is mounted above the body by means of a pylon 6—6 serving to support a ring 7 on which the hub, generally indicated at H, is journalled for tilting movement. Preferably, the hub is provided with two tilting axes, one transverse and the other longitudinal, so as to provide freedom for tilting in all directions for control purposes, in the manner more fully set out in copending application of Juan de la Cierva, Serial No. 645,985, filed December 6th, 1932.

The tilting of the rotor may be effected by means of the control stick or column 8 having a hand grip 9, the stick being mounted for universal movement as at 10. Lateral and longitudinal tilting links 11 and 12 are jointed as at 8a to the upper end of the control column and connected with the hub, and thereby provide for tilting of the hub laterally and longitudinally upon corresponding movements of the control column 8.

The rotor head assembly, best shown in Figure 2, comprises a non-rotary housing 13 which is mounted in the fixed rotor supporting structure by means of the tilting pivots above referred to. The rotative hub part 14 includes a downward extension forming an axle which is mounted in bearings 15 carried by the housing 13. The rotor blades, of which the root end of one is indicated at 16, are secured by a flange attachment to stubs 17 and each stub is articulated to the hub 14 by means of a universal joint comprising a trunnion block 18 having pivot pins 19 on which the blade stub 17 is articulated for flapping of the blade in a plane containing the axis of the hub, the trunnion block 18 being also provided with pivot pins 20 supported by means of bearings 21 in housings 22 formed on the hub 14. The axis of the last mentioned pivotal connection (the drag pivot) constitutes a combined lagging and pitching pivot for the blade, its axis being inclined outwardly and upwardly with respect to the axis of the hub so that lagging of the blade is accompanied by a decrease of pitch angle, and conversely.

Each trunnion block 18 is provided with a lever 23 engaged by a projection 24 formed on a shaft 25 coaxial with and rotatable relatively to the hub 14, the lower end of the shaft 25 being connected by means of a universal joint 26 to a transmission shaft 27 constituting a part of the transmission system connected to the engine by means of the transmission clutch (not shown). When the latter is engaged and the engine running the shaft 25 is driven and overruns the hub 14, and the projections 24 thereof, engaging the levers 23, rock the trunnion blocks 18 on the axis of pivot 20—20 so as to cause the blades to lag relatively to the hub and decrease their pitch angle. The relative movement of these parts is limited by stop means (not shown) which are preferably so disposed that the limiting lagging position of the blades is that corresponding to zero pitch angle, and it will be clear that these stop means at the same time limit the overrunning of the hub 14 by the shaft 25.

The structure of the rotor hub and blade mounting and drive mechanism thus far described is substantially in accordance with the copending application of Bennett above referred to and is to be considered as an example of the type of hub structure to which the features of the present invention are especially suited.

In a mechanism of this general type, the present invention provides for positively locking the parts in such position that the blade pitch is low (preferably zero) and the invention further provides for maintenance of this condition in spite of fluctuations in driving torque or momentary cessation thereof, until the pilot releases the locking device.

In the particular form of hub shown, the desired locking of the blade pitch is brought about by locking together the hub 14 and shaft 25. For this purpose a dog clutch 28, 29 is provided, of which the fixed jaw 28 is fixed on the lower end of the hub part 14, and the movable jaw 29 is slidable but not rotatable on the lower end of the shaft 25. The lower jaw is normally urged downwardly (out of engagement) by a spring 29a.

The sliding jaw 29 is actuated by a striking fork 30 mounted on a bracket 31 fixed to the housing 13, and the striking fork is connected by means of a spring 32 to the tension member 33 of a "Bowden" control whose sheath 34 is anchored at one end in the bracket 31 carried by the housing 13, and at the other end in a thimble 35 riveted into the tubular stem of the flying control column 8, which, as seen in Figure 1, is of the "hanging" type. The lower end of the tension connection 33 is anchored in a pin 36 engaging in hook-shaped slots 37 in the wall of the control column 8. The pin 36 is further provided with an external operating knob 38 and is fixed in an internal sleeve 39 sliding in the control column 8. The base of the sleeve 39 is inwardly flanged to engage the head 40 of a rod 41, whose other end projects from the bottom of the control column as a latch and is engageable in the bore of a cooperating tubular latch member 42 mounted on a fixed bracket 43. Between the base of the sleeve 39 and a flange 44, which latter is secured on the rod 41, is arranged a helical spring 45. The projecting end of the rod 41 is chamfered at 46 to enable it to ride easily over the lip of the latch member 42.

The arrangement of the pin 36, knob 38 and slots 37 and the projecting latch of the rod 41 are clearly shown in Figures 3 and 4.

The interior of the tubular latch member 42 further contains a slidable plunger 47 which is seated on a helical spring 48 and is connected to the tension member 49 of a "Bowden" control. The other end of the tension member 49 is connected to a catch 50 seated on a helical spring 51 and engageable with a shoulder 52 on a disclike member 53, which is connected to the control means of the rotor transmission clutch and is provided with an operating handle 54.

In place of the "Bowden" type cable controls above referred to, any suitable system of links or levers may be substituted.

The jaws 28, 29 of the dog clutch are of ratchet form, the direction of the ratchet teeth being such as to cause the jaws to lock when the hub 14 tends to overrun the floating shaft 25 and to allow the jaws to slip when the relative movement of the parts is in the opposite direction, and the jaws are so relatively positioned that when fully engaged the floating shaft 25 is fully advanced with respect to the hub 14 and the blades are consequently in the limiting lagging position with respect to the hub and their pitch angle is zero. The engagement of the dog clutch therefore positively locks the floating member to the hub in this position. The tooth spacing of the jaws is greater than the total relative movement of which the parts 25 and 14 are capable, so that the jaws cannot be forced into full engagement by the striking fork 30 unless the hub and shaft are first brought into the appropriate relative position. Therefore, if the knob 38 is brought into the position for engaging the jaws 28, 29 (the position shown in the drawings), and the floating shaft 25 is not in the driving position, i. e., fully advanced relatively to the hub 14, the spring 32 will yield to accommodate the partial separation of the jaws 28, 29.

The operation of this mechanism is as follows:

The aircraft being on the ground prior to starting, the knob 38 is manipulated to lodge the pin 36 in the hooked end of slots 37 as shown, thus tensioning spring 32 and causing the striking fork 30 to press the jaws 28, 29 together; with the pin 36 so located, spring 45 in hand grip 9 is compressed and presses on the collar 44, causing the end of rod 41 to protrude from the lower end of the hand grip. The latter is then centralized laterally and moved to the limit of its forward travel, in which position the end of rod 41 enters the latch part 42 being enabled to spring over its lip by yielding of spring 45 and the action of the chamfer 46. When the control column is latched, the end of rod 41 presses down the plunger 47 against spring 48 and releases the tension on the cable 49 allowing spring 51, which is weaker than spring 48, to press forward the catch 50.

The handle 54 is then rotated (clockwise) into the position shown, thus rotating the disc 53 into the position shown and thereby causing the rotor transmission clutch to engage. In this position, catch 50 engages behind the shoulder 52 of disc 53 and prevents the rotor transmission clutch from being disengaged until the catch 50 is released.

Engagement of the transmission clutch causes the floating shaft 25 to be rotated by the transmission shafting 27. The shaft 25, therefore, overruns the hub 14 and moves the rotor blades 16, by means of the engagement of parts 24, 23, into the lagging, zero-pitch position, in which position further relative movement of the parts 25, 14 is arrested by means of any suitable stops. At the same time, the jaws 28, 29 of the dog clutch slip over one another, the sliding jaw being pressed down further with further yielding of spring 32 until the ratchet teeth register and are sprung into engagement by spring 32, thus locking parts 25 and 14 together in the driving position.

If now the engine fails or falters, the blades cannot be thrown into high pitch position, being locked in the zero pitch position.

As soon as the pilot is ready to take off, the knob 38 is manipulated to disengage the pin 36 from the hooked ends of slots 37, thereby releasing the tension on cable 33 and allowing the spring 29a to disengage the dog clutch 28, 29. The consequent movement of the striking fork 30 transmitted by spring 32 and cable 33 raises pin 36 and sleeve 39, whose lower flanged end raises the head 40 of rod 41 and withdraws the end of the latter from the latch member 42, thus unlatching the control column and allowing the plunger 47 to be raised by spring 48. This withdraws catch 50 from the shoulder 52 by means of cable 49, the spring 51 being compressed by reason of the superior strength of spring 48. The disc 53 may now be turned by handle 54 to disengage the rotor transmission clutch, and the jump take-off immediately ensues, the hub being now free to overrun the driving shaft 25.

If desired, the pin 36 may be brought back into the hooked ends of slots 37 in readiness for repeating the operation, while the rotor is autorotating in flight, since the jaws 28, 29 cannot engage fully and lock the parts 25 and 14 together until they have been brought into the appropriate relative position for driving; and as long as the shaft 25 is not driven the engagement of the sloping faces of the ratchet teeth of jaws 28, 29 tends to hold the shaft 25 in the limiting lagging position with respect to the hub 14.

What I claim is:

1. In an aircraft having a sustaining rotor incorporating a hub and a blade, the latter being mounted for pitch change movement, a member for driving the rotor associated with the rotor hub but capable of limited rotation with respect thereto, means cooperating with said member and the blade mounting to provide for decrease of the blade pitch when the member and hub occupy predetermined relative positions under the influence of drive of said member, and releasable means for locking the hub and driving member in said predetermined positions in which the blade pitch is decreased.

2. In an aircraft having a sustaining rotor incorporating a hub and a blade, the latter being mounted for pitch change movement, a member for driving the rotor associated with the rotor hub but capable of limited rotation with respect thereto, means cooperating with said member and the blade mounting to provide for decrease of the blade pitch when the member and hub occupy predetermined relative positions under the influence of drive of said member, a rotor drive transmission associated with said member and incorporating a disconnectible clutch, releasable means for locking the hub and driving member in said predetermined positions in which the blade pitch is decreased, and means interlocking the operation of said releasable means and said clutch and providing against disconnection of the clutch when the releasable means is engaged.

3. In an aircraft having a sustaining rotor incorporating a hub and a blade, the latter being mounted for pitch change movement, a member for driving the rotor associated with the rotor hub but capable of limited rotation with respect thereto, means cooperating with said member and the blade mounting to provide for decrease of the blade pitch when the member and hub occupy predetermined relative positions under the influence of drive of said member, controllable means for shifting the lift line of the rotor for purposes of control of the craft in take-off and flight including a manually operable control organ, means for latching said control organ in a predetermined position, releasable means for locking the hub and driving member in said predetermined positions in which the blade pitch is decreased, and means interrelating the operation of said releasable means and said latching means and providing for conjoint release of both.

4. In an aircraft having a sustaining rotor incorporating a hub and a blade, the latter being mounted for pitch change movement, a member for driving the rotor associated with the rotor hub but capable of limited rotation with respect thereto, means cooperating with said member and the blade mounting to provide for decrease of the blade pitch when the member and hub occupy predetermined relative positions under the influence of drive of said member, controllable means for shifting the lift line of the rotor for purposes of control of the craft in take-off and flight including a manually operable control organ, means for latching said control organ in a predetermined position, a rotor drive transmission associated with said member and incorporating a disconnectible clutch, releasable means for locking the hub and driving member in said predetermined positions in which the blade pitch is decreased, and means interrelating the operation of said releasable means, said clutch and said latching means and providing for conjoint release of the latching means and the releasable means and further providing against disconnection of said clutch when the releasable means is engaged.

5. In an aircraft having a sustaining rotor incorporating a hub and a blade mounted thereon with freedom for pitch change movement, rotor drive mechanism including a disconnectible clutch with a manual control element therefor having means for retaining the clutch in engaged position and releasable means for locking the blade in a substantially non-lifting pitch position, the releasable means being engageable only when the rotor is being driven, and the operation of the retaining means and of said releasable means being interlocked to provide against actuation of the manual control to disengage the clutch when the releasable means is engaged.

6. An aircraft having a sustaining rotor incorporating a hub and blades mounted for pitch change movement thereon, a member for driving the rotor, releasable means for locking the blades in low pitch, controllable means for shifting the lift line of the rotor for the purpose of control of the craft in take-off and flight including a manually operable control organ, means for latching said control organ in a predetermined position, and means interrelating the operation of said releasable means and said latching means and providing for conjoint release of both.

7. An aircraft having a sustaining rotor incorporating a hub and blades mounted for pitch change movement thereon, a member for driving the rotor, releasable means for locking the blades in low pitch, controllable means for shifting the lift line of the rotor for the purpose of control of the craft in take-off and flight including a manually operable control organ, means for latching said control organ in a predetermined position, a disconnectible clutch associated with said member for driving the rotor, latch means for locking said clutch in engaged position and means interrelating the operation of said releasable means for the blade lock, said means for latching the control organ and said latch means for locking the clutch to provide for conjoint release of all three.

GEORGE BERTRAND LESLIE ELLIS.